US007801106B2

(12) United States Patent
Uskela et al.

(10) Patent No.: US 7,801,106 B2
(45) **Date of Patent: *Sep. 21, 2010**

(54) PREVENTION OF SPOOFING IN TELECOMMUNICATIONS SYSTEM

(75) Inventors: Sami Uskela, Helsinki (FI); Hannu Jokinen, Otalampi (FI)

(73) Assignee: Nokia Corporation, Espoo (FI)

( * ) Notice: Subject to any disclaimer, the term of this patent is extended or adjusted under 35 U.S.C. 154(b) by 396 days.

This patent is subject to a terminal disclaimer.

(21) Appl. No.: 11/853,657

(22) Filed: Sep. 11, 2007

(65) Prior Publication Data

US 2007/0297413 A1 Dec. 27, 2007

Related U.S. Application Data

(63) Continuation of application No. 10/175,517, filed on Jun. 20, 2002, now Pat. No. 7,342,926, which is a continuation of application No. PCT/FI00/01114, filed on Dec. 19, 2000.

(30) Foreign Application Priority Data

Dec. 22, 1999 (FI) .................................. 19992767

(51) Int. Cl.
*H04J 3/24* (2006.01)

(52) U.S. Cl. ....................................... 370/349; 370/392

(58) Field of Classification Search ................. 370/392, 370/389, 338, 342, 401, 310.2, 328, 332, 370/349, 402, 395.54; 709/224, 225, 226, 709/227, 228, 229; 713/153, 162, 170, 182
See application file for complete search history.

(56) References Cited

U.S. PATENT DOCUMENTS 6,158,008 A * 12/2000 Maria et al. ................... 726/13
6,608,832 B2 8/2003 Forslow
6,725,378 B1 4/2004 Schuba et al.
6,738,814 B1 5/2004 Cox et al.
6,754,214 B1 6/2004 Mahalingaiah
7,342,926 B2 * 3/2008 Uskela et al. ............... 370/392
2004/0093431 A1 5/2004 Gentry et al.

FOREIGN PATENT DOCUMENTS

| | | | |
|---|---|---|---|
| EP | 493892 | A2 | 7/1992 |
| EP | 668680 | A1 | 8/1995 |
| JP | 4360336 | | 12/1992 |
| JP | 548614 | | 2/1993 |
| JP | 5327717 | | 12/1993 |

(Continued)

OTHER PUBLICATIONS

Schuba et al, "Analysis of a Denial of Service Attack on TCP," IEEE Symposium on Proceedings, Security and Privacy, 1997, pp. 208-223.

(Continued)

*Primary Examiner*—Brenda Pham
(74) *Attorney, Agent, or Firm*—Harrington & Smith

(57) ABSTRACT

In a packet radio network a packet data address is activated for a terminal for transmitting data packets between the terminal and an external network. Information on the activated packet data address is stored at least in the edge nodes of the network. To prevent spoofing, i.e., misrepresentation of sender data, the method and network node of the invention comprise checking in the node whether the source address of the packet transmitted from the terminal is the same as the packet data address used in the transmission of the packet or does the source address belong to a set of allowed packet data addresses. The packet is transmitted from the node towards the destination address only if the addresses are identical or the source address belongs to the set of allowed packet data addresses.

15 Claims, 1 Drawing Sheet

FOREIGN PATENT DOCUMENTS

| | | | |
|---|---|---|---|
| JP | 637752 | | 2/1994 |
| JP | 9172450 | | 6/1997 |
| JP | 9186713 | | 7/1997 |
| JP | 11088336 | | 3/1999 |
| JP | 200069083 | | 3/2000 |
| JP | 200069084 | | 3/2000 |
| WO | 9917499 | A2 | 4/1999 |
| WO | 9948303 | A2 | 9/1999 |

OTHER PUBLICATIONS

"Security of Current Mobile IP Solutions", Smart Jacobs, et al., IEEE 1997, p. 1122-1128.

"GPRS and 1S-136 Integration for Flexible Network and Services Evolution", Stefano Faccin et al., IEEE 1999, p. 48-54.

"Quality of Service in General Packet Radio Service", Murat Bilgic et al., IEEE 1999, p. 226-231.

"Multimedia Messaging Services for GPRS and UMTS", Jarkko Sevanto, IEEE 1999, p. 1422-1426.

"Digital cellular telecommunications system (Phase 2+); General Packet Radio Service (GPRS); Interworking between the Public Land Mobile Networks (PDN) (GSM 09.61 version 6.2.0 Release 1997)", TS 101 348 V6.2.0, Sep. 1998, 23 pgs.

"Digital cellular telecommunications system (Phase 2+); General Packet Radio Service (GPRS); Service description; Stage 2 (GSM 03.60 version 6.3.2 Release 1997)", EN 301 344 V6.3.2, Jul. 1999, 107 pgs.

* cited by examiner

PREVENTION OF SPOOFING IN TELECOMMUNICATIONS SYSTEM

This application is a continuation of U.S. patent application Ser. No. 10/175,517, filed on Jun. 2, 2002, which is a continuation of International Application PCT/FI00/01114, filed 19 Dec. 2000, which, in turn, relies upon Finnish Patent Application No. 19992767, filed Dec. 22, 1999, the contents of all of which are hereby incorporated herein by reference in their entireties.

FIELD OF THE INVENTION

The invention relates to prevention of spoofing in telecommunications systems which are capable of transmitting packet data. In particular, the invention relates to preventing spoofing of sender data in IP (Internet Protocol) packets sent from a mobile station in mobile communication systems.

BACKGROUND OF THE INVENTION

Mobile communication networks function as effective access networks which provide the users with access to the actual data networks for mobile data transmission. Mobile data transmission is supported particularly well by digital mobile communication systems, such as the pan-European mobile communication system GSM (Global System for Mobile Communication). In this application the term 'data' refers to any information transmitted in a digital telecommunications system. Such information may comprise digitally encoded audio and/or video, inter-computer data traffic, telefax data, short sections of program codes, etc. The mobile communication system generally refers to any telecommunications system which employs wireless communication when the users move within the service area of the system. A typical example of a mobile communication system is a public land mobile network PLMN. The mobile communication network is often an access network which provides the user with wireless access to external networks, hosts or services offered by specific service producers.

One of the main goals in the development of the mobile communication systems has been to offer an opportunity of using IP services via the mobile communication network so that the mobile station can also function as the host. This is possible in a general packet radio service GPRS, for example. The GPRS service provides packet data transmission between mobile data terminals and external data networks in the GSM system. To send and receive GPRS data, a mobile station has to activate the packet data address it wants to use by requesting a PDP (Packet Data Protocol) activation procedure. This operation makes the mobile station known in the corresponding gateway support node, and thus interworking with the external data networks using the activated packet data address can be initiated. Similar solutions are also being designed for the 'third-generation mobile communication systems', such as the UMTS (Universal Mobile Communications System) and IMT-2000 (International Mobile Telecommunications 2000).

Particularly in IP networks spoofing, i.e. forging of the source address of an IP data packet, is easy. In other words, the host transmitting the IP packet may pretend to be someone else and send packets in the name of A to B who sends a response to A. In that case both A and B will be interfered with. One solution to this problem is to use firewalls. In these the user is not, however, authenticated but only source and destination addresses are monitored. In a firewall, source addresses are usually described with the accuracy of a subnetwork. Consequently, the firewall cannot know the real sender of the packet, and hosts in the same subnetwork can represent themselves as each other. Since the source addresses allowed in the firewall have to be known in advance and the mobile station must be able to move from the area of one firewall to the area of another without changing its IP address, the allowed source addresses of the firewalls in practice cover all mobile stations which are capable of accessing a subnetwork protected by the firewall. The problem caused by this is that the source address of the IP packet is not reliable and to prevent spoofing the mobile host has to be authenticated separately. Prevention of spoofing is particularly important when IP services for which the host is charged are used. A reliable authentication procedure may, however, increase the delay in the network or waste limited resources, i.e. the air interface, in the mobile communication networks.

BRIEF DESCRIPTION OF THE INVENTION

The object of the invention is to provide a method and an apparatus implementing the method so that a receiver of a data packet can rely on the fact that the source address of the data packet indicates the real sender of the packet.

The objects of the invention are achieved with a method of preventing spoofing in a telecommunications system which comprises a terminal capable of transmitting data packets and at least one node for receiving and forwarding data packets in a first subsystem. The method comprises the following steps of: activating in the first subsystem a packet data address for the terminal for transmitting data packets between the terminal and a second subsystem; storing the packet data address in at least one node of the first subsystem via which the data packets of the packet data address are routed; receiving in said node the packet sent from the terminal, the packet comprising a destination address and a source address; checking in said node whether the source address of the packet is the same as the packet data address; and transmitting the packet from the node towards the destination address only if the addresses are identical.

The invention further relates to a method of preventing spoofing in a telecommunications system which comprises a terminal capable of transmitting data packets and at least one node for receiving and forwarding data packets in a first subsystem, the method comprising the following steps of: activating in the first subsystem a packet data address for the terminal for transmitting data packets between the terminal and a second subsystem; storing the packet data address in at least one node of the first subsystem via which the data packets of the packet data address are routed; receiving in said node the packet sent from the terminal, the packet comprising a destination address and a source address; defining the packet data address as a set of allowed packet data addresses; checking in said node whether the source address of the packet belongs to the set of allowed packet data addresses; and transmitting the packet from the node towards the destination address only if the source address of the packet belongs to the set of allowed packet data addresses.

The invention also relates to a network node of a packet network for transmitting data packets from a terminal of the packet network to a receiver, the network node being arranged to activate at least one packet data address for the terminal which the terminal can use when transmitting data packets, and to attach a packet received from the terminal to the packet data address used by the terminal. The network node is characterized in that in response to receiving a packet, the network node is arranged to compare the source address of the packet with the packet data address used by the terminal and to send the packet from the network node towards the destination address of the packet only if the addresses are identical.

The invention further relates to a network node of a packet network for transmitting data packets from a terminal of the packet network to a receiver, the network node being arranged to activate at least one packet data address for the terminal which the terminal can use when transmitting data packets, and to attach a packet received from the terminal to the packet data address used by the terminal. The network node is characterized in that the packet data address is defined as a set of allowed packet data addresses; and in response to receiving a packet, the network node is arranged to check whether the source address of the packet belongs to the set of allowed packet data addresses of the packet data address used by the terminal and to send the packet from the network node towards the destination address of the packet only if the source address belongs to the set of allowed packet data addresses.

The invention is based on the idea that, thanks to the packet data address activated for transmitting data packets, a gateway support node GGSN, for example, knows the packet data address of the mobile station which has sent the data packet. So the gateway support node GGSN only needs to compare the source address in the data packet with the packet data address used by the mobile station. If the addresses are identical, the address has not been forged and the packet can be forwarded to the destination address.

An advantage of the invention is that it is very simple to implement, and yet it allows spoofing prevention. For example, the receiver of an IP packet can rely on the fact that the source address of the IP packet authenticates the sender of the IP packet. No additional authentication mechanism is needed, and consequently the network is not loaded, which allows to minimize the delay. The invention also facilitates implementation of chargeable services because the service producer can rely on the fact that the source address in the data packet indicates the user to be charged.

In a preferred embodiment of the invention comparison is carried out in the gateway support node. An advantage of this embodiment is that the comparison mechanism is added to the elements the number of which is small in the network.

In another preferred embodiment of the invention comparison is carried out in an edge node of the packet radio network serving the mobile station. An advantage of this embodiment is that the packet radio network is not loaded by transmitting packets which are not delivered in any way.

In a preferred embodiment of the invention comparison is performed only on the packets which use a packet data protocol enabling spoofing, i.e. forging of the source address. An advantage of this embodiment is that comparison is not performed in vain on packets the source address of which cannot be forged.

Preferred embodiments of the method and network node of the invention are disclosed in the appended dependent claims.

BRIEF DESCRIPTION OF THE DRAWINGS

The invention will be described in greater detail by means of preferred embodiments with reference to the enclosed drawings, in which.

DETAILED DESCRIPTION OF THE INVENTION

The present invention is applicable to any packet switched system in which an individual packet data address is activated as in the GPRS system before it can be used and in the network infrastructure of which information is maintained on the user's active packet data address. These systems include the 'third-generation mobile communication systems', such as the Universal Mobile Telecommunications System (UMTS) and IMT-2000 (International Mobile Telecommunications 2000), mobile communication systems corresponding to the GSM system, such as the DCS 1800 (Digital Cellular System for 188 MHz) and PCS (Personal Communication System), and WLL systems which are based on the above-mentioned systems and implement a GPRS-type packet radio. Furthermore, the invention can be applied in systems other than mobile communication systems, such as cable modem networks and similar fixed systems. The invention will be described in the following using the GPRS service of the GSM system as an example, but the invention is not limited to such a system. The definitions of mobile communication systems change rapidly, which may necessitate additional changes to the invention. For this reason, all the terms and expressions should be interpreted broadly, and it should also be kept in mind that they are only intended to describe the invention, not to limit it.

Figure 1:
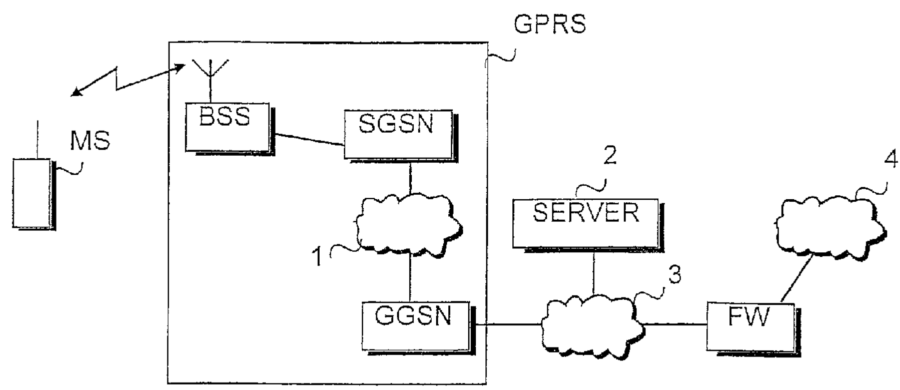
FIG. 1 is a block diagram illustrating the network architecture of a GPRS service.

FIG. 1 illustrates the network architecture of a GPRS service at a general level because a more detailed structure of the network is irrelevant to the invention. The structure and function of the GSM system are very familiar to a person skilled in the art. The structure of the GPRS service is defined e.g. in ETSI specification 03.60, version 6.0.0 (Digital cellular telecommunications system (Phase 2+); General Packet Radio Service (GPRS); Service Description; Stage 2), which is incorporated herein by reference. The GPRS service comprises an access network which provides radio access and is represented by the base station subsystem BSS of the GSM system in FIG. 1. The GPRS service also comprises, as edge nodes, support nodes of the GPRS service for packet switched transmission of data between a packet data network PDN and a mobile station MS. The support nodes include a serving GPRS support node SGSN and a gateway GPRS support node GGSN. These support nodes SGSN and GGSN are interconnected by a backbone network 1. It should be noted that the functionalities of the SGSN and the GGSN can also be physically combined into the same network node, in which case the operator's backbone network is unnecessary. Logically the nodes are, however, separate nodes.

The serving GPRS support node SGSN serves the mobile station MS. Each support node SGSN produces a packet data service for mobile data terminals, i.e. mobile stations MS, within the area of one or more cells in a cellular packet radio network. For this purpose, each support node SGSN is typically connected to the GSM mobile communication system (typically to the base station controller in the base station subsystem BSS) so that the intermediate mobile communication network provides radio access and packet switched data transmission between the SGSN and the mobile stations. In other words, the mobile station MS in a cell communicates with a base station over the radio interface and further through the base station subsystem with the support node SGSN to the service area of which the cell belongs. The main functions of the SGSN node are to detect new GPRS mobile stations in its service area, to carry out registration of new mobile stations MS together with GPRS registers, to send data packets to or to receive them from the GPRS mobile station and to maintain a file on the location of the mobile stations MS within its service area. This means that the SGSN performs security functions and access control, such as authentication and encryption procedures. Using a unique tunnel the SGSN routes a packet received from the mobile station in encapsulated form over the GPRS backbone network to the GGSN node where the packet data address is activated.

GPRS gateway support nodes GGSN connect the operator's GPRS network to the external systems, data networks, such as an IP network (Internet) or an X.25 network, and servers 2. The GGSN can also be directly connected to a private company network or to a host. In the example of FIG. 1, the GGSN is connected to the servers 2 via a reliable IP network 3 and to the Internet 4 via a firewall FW. The GGSN comprises GPRS subscribers' PDP addresses and routing information, i.e. the SGSN addresses. The GGSN updates the location file using the routing information produced by the SGSN nodes on the route of the mobile station MS. The GGSN functions as a router between an external address and internal routing information (e.g. SGSN). In other words, the GGSN routes a protocol packet of an external data network in encapsulated form over the GPRS backbone network to the SGSN node which at the given moment is serving the mobile station MS. It also decapsulates the packet sent from the mobile station and transmits the packets of the external data network to the data network concerned. The GGSN may also transmit packets from one mobile station to another within the network. In addition, the GGSN is responsible for billing of data traffic.

The mobile station MS may be any mobile node which supports packet data transmission and has a radio interface to the network. It can be, for example, a laptop PC which is connected to a cellular phone capable of packet radio operation, or an integrated combination of a small computer and a packet radio phone. The other embodiments of the mobile station MS include various pagers, remote-controllers, monitoring and/or data acquisition devices, etc. The mobile station may also be called a mobile node or a mobile host.

To access the GPRS services, the mobile station first has to make its presence known to the network by carrying out a GPRS attach operation. This operation establishes a logical link between the mobile station MS and the SGSN node and makes the mobile station available for a short message over the GPRS or a similar message transmitted without a connection, paging via the SGSN and notification of incoming GPRS data. To put it more accurately, when the mobile station MS attaches to the GPRS network (in a GPRS attach procedure), the SGSN creates a mobility management context (MM context) and a logical link LLC (Logical Link Control) is established between the mobile station MS and the SGSN node in a protocol layer. The MM context is stored in the SGSN node and mobile station MS. The MM context of the SGSN node may contain subscriber data, such as the subscriber's IMSI, TLLI (Temporary Logical Link Identifier) and location and routing information, etc.

To send and receive GPRS data, the mobile station MS has to activate the PDP address, i.e. the packet data address, it wants to use by requesting a PDP activation procedure. The PDP context can be activated when the mobile station attaches to the GPRS network. Alternatively, the mobile station may activate the PDP context later or activation may be performed as a result of an activation request received from the GPRS network (GPRS network requested PDP context activation). The GPRS interface comprises one or more individual PDP contexts which describe the packet data address and the parameters related thereto. To be more precise, the PDP context defines different data transmission parameters, such as the PDP type (e.g. X.25 or IP), PDP address (e.g. IP address), quality of service QoS and NSAPI (Network Service Access Point Identifier). One mobile station can have several similar PDP addresses, e.g. different IP addresses as PDP addresses (that is, the mobile station has several IP-type contexts). For example, different IP addresses, i.e. contexts, can be used for services of different quality and price transmitted using the IP protocol. The packet data address of the PDP context is either permanent (i.e. defined in the subscriber data of the home location register) or dynamic, in which case the GGSN allocates the packet data address during the PDP activation procedure. The PDP activation procedure activates the PDP context and makes the mobile station MS known in the corresponding GGSN node, and consequently interworking with external data networks be initiated. During the PDP context activation the PDP context is created in the mobile station and in the GGSN and SGSN nodes. When the PDP context is being activated, the user is authenticated by means of GSM procedures, and thus the packet data address, e.g. IP address, given to the terminal in PDP context activation can be reliably attached to the user's identification code, e.g. IMSI (International Mobile Subscriber Identity).

The PDP context is created and the packets tunnelled using a GTP protocol (GPRS Tunnelling Protocol). The mobile station MS activates the PDP context with a specific message, Activate PDP Context Request, in which the mobile station provides information on the TLLI, PDP type, requested QoS and NSAPI, and optionally on the PDP address and access point name APN. The SGSN sends a 'Create PDP Context' message to the GGSN node which creates the PDP context and sends it to the SGSN node. If the 'Activate PDP Context Request' message (and the 'Create PDP Context' message) does not include the PDP address, the GGSN will allocate the PDP address during the creation of the PDP context and include a dynamic PDP address in the PDP context to be sent to the SGSN. The SGSN sends the PDP context to the mobile station MS in an 'Activate PDP Context Response' message. The PDP context is stored in the mobile station MS, SGSN node and GGSN node. In the serving SGSN node, each PDP context is stored together with the MM context. When the MS roams to the area of a new SGSN node, the new SGSN requests the MM context and PDP contexts from the old SGSN node.

Thus, in the PDP context activation procedure a virtual connection or link is established between the mobile station MS and the GGSN node. At the same time, a unique tunnel is formed between the GGSN and the SGSN for this PDP context and packet data address. The tunnel is a route which the IP packet follows and by means of which a packet transmitted from the mobile station is attached to a certain PDP context and certain packet data address in the GGSN. In other words, the tunnel is used for identifying the packet data address the mobile station used when it sent the packet. The packet is attached to a certain PDP context either with a TID (Tunnel Identifier) or with a tunnel end point identifier when the GTP protocol is used. The TID contains an NSAPI and an IMSI. During the PDP context activation procedure the GGSN may allocate the tunnel end point identifier to be used to point the PDP context.

Figure 2:
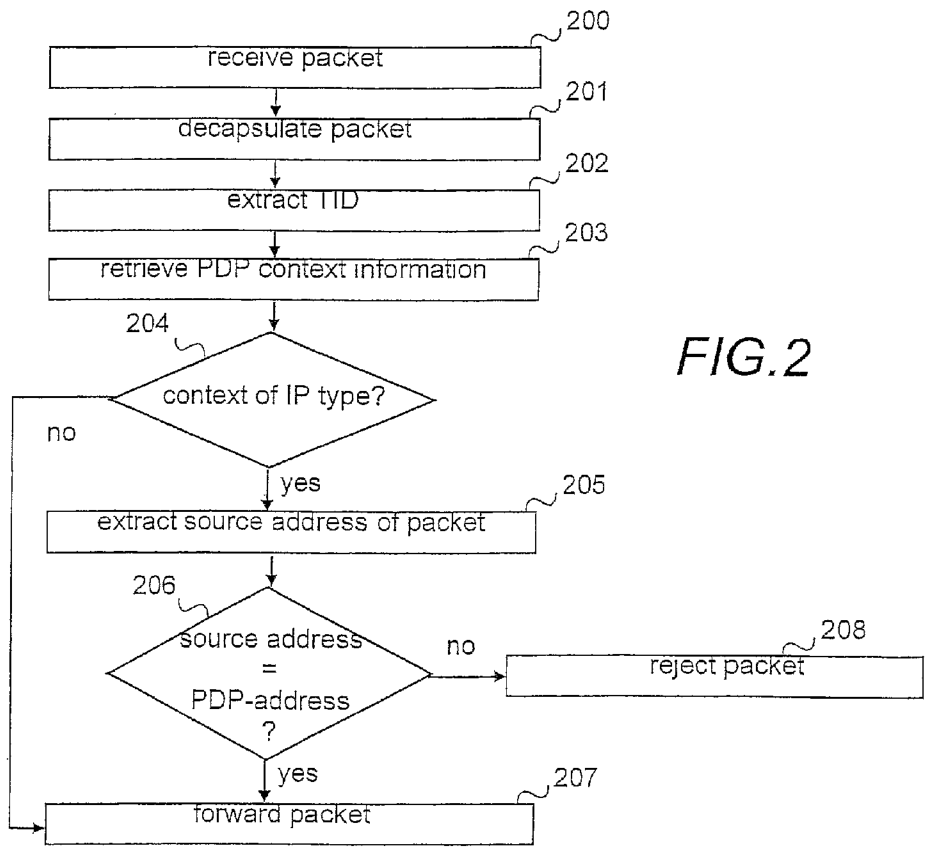
FIG. 2 is a flow chart illustrating operation according to the invention.

FIG. 2 is a flow chart illustrating operation according to a first preferred embodiment of the invention in the gateway support node GGSN. In the first preferred embodiment of the invention, the source address included in the packet is compared with the activated packet data address only in the PDP contexts the type of which enables spoofing. These include IP-type contexts and packet data addresses. These types (or type) are defined in the node which performs the comparison. In the example of FIG. 2 it is assumed that spoofing is possible only with IP addresses and does not succeed with other packet data address types. It is also presumed that the mobile station has activated the PDP context used by it, i.e. assumed an IP address, for example, and sends an IP packet e.g. to the server 1 illustrated in FIG. 1 or to the Internet 4. It is further presumed that the TID is used to identify the tunnel.

Referring to FIG. 2, in step 200 the GGSN receives a packet using a unique tunnel, decapsulates it in step 201 and extracts the tunnel identifier TID in step 202. In step 203 the GGSN retrieves, by means of the TID, PDP context information of the PDP context corresponding to the TID. The information includes the packet data address, i.e. PDP address, which is represented by an IP address in this example Then in step 204 the GGSN checks whether the PDP context (i.e. packet data address) corresponding to the tunnel is of the IP type. If it is, the GGSN extracts the source address given in the title of the packet in step 205. When the GGSN knows both the addresses, it compares them in step 206. If the source address is the same as the PDP address of the PDP context, the mobile station is the one it claims to be in the IP packet, and consequently the GGSN forwards the packet in step 207. If the source address differs from the PDP address, the mobile station pretends to be another mobile station, and therefore the GGSN rejects the packet in step 208. Here rejection means that the packet is not sent to the destination address.

What happens to the packet after rejection depends on the operator's definitions and is irrelevant to the invention. For example, the user and the terminal may be notified of the source address not being what it should be by using control plane signalling. The GGSN, for example, may also send an alarm message to the operator's network operations and maintenance centre. It is also possible to make an entry containing the PDP context information and packet information into an error log file. The content of the rejected packet may also be written into the error log file. Furthermore, yet another option for notifying the user and the terminal of the false source address is to deactivate the PDP context that was used to send the fraudulent packet. The PDP context is deactivated in the GGSN, SGSN and MS, e.g. so that the GGSN requests the SGSN to deactivate the PDP context (or if it is the SGSN that rejects the packet, the SGSN will send the deactivation request to the GGSN) and the SGSN requests the MS to deactivate the PDP context. The deactivation request messages preferably include, as a cause code, a specific deactivation code indicating that the MS or an application in association with the MS has used a false or fraudulent source address. As a result of the specific cause code the user is notified of the attempt to use the false source address. The main reason for using this notification is that either the user is discouraged from cheating or the user is notified of an application using the false source address. Preferably, the notification to the end user is a text message or a message window identifying the application that attempted to transmit data with the false source address. The above described actions may also be carried out only after a predetermined amount of fraudulent packets have been rejected. When the MS is notified of the use of the false source address, the message, which the GGSN, for example, sends to the MS and/or to the operator's network and maintenance centre, may preferably carry some information on upper layer protocol (e.g. TCP or UDP) headers of the packet which had the false source address. This facilitates finding of the fraudulent application and the purpose of the fraudulent activity. The messages may even contain the entire content of the rejected packet(s). The packet flow of rejected packets may even be forwarded to an external node such as the operator's network operation and maintenance centre.

If it is noticed in step 204 that the PDP is not of the IP type, the GGSN will move directly to step 207 and forward the packet.

The purpose of the check in step 206 is to make sure that only packets the sender of which has not pretended to be someone else are forwarded to external networks by the GGSN. Only a simple check is sufficient for authenticating the sender according to the invention, and there is no need for authentication signalling.

In another preferred embodiment of the invention the check of step 206 is performed in the SGSN and step 201 is omitted because the packet received from the mobile station is not encapsulated. In the other preferred embodiment, the SGSN extracts, in step 202, the TLLI and the NSAPI from the packet it received from the MS instead of the TID. The TLLI uniquely identifies the MS, and thus the IMSI, within the routing area. The NSAPI identifies the PDP context used by the MS with this packet. Using the TLLI and the NSAPI the SGSN retrieves the PDP context information. In the other preferred embodiment the TID (or other corresponding information identifying the PDP context) is added to the packet and the packet is encapsulated before step 207, i.e. before the packet is sent to the GGSN.

In the future, an address space of PDP addresses might be related to one PDP context or to a corresponding connection definition. The address space can be a list of allowed PDP addresses, for example. In that case it is sufficient that the source address included in the packet is among the allowed addresses. Similarly, in the future, the PDP context information may specify the allowed PDP address as a set of allowed addresses (i.e. address space) by defining part of the allowed PDP address. In that case the source address in the packet has to comprise the defined part of the address, i.e. the source address has to belong to the set of allowed addresses. The address space may also be defined by using both methods described above. The address space can be defined in some other way, too.

In embodiments where several packet data address types enabling spoofing are defined, it is checked in step 204 whether the packet data address used in the packet is one of these. If it is, we continue from step 205. Otherwise we move to step 207.

In some preferred embodiments of the invention the source address included in the packet is compared with the activated packet data address regardless of the type of the activated packet data address. In that case the check of step 204 is not performed, but the check of step 206 is performed on each packet.

The order of steps shown in FIG. 2 may differ from what has been described above and the steps can also be performed simultaneously. For example, step 204 can be performed before step 201 and step 203 simultaneously with step 205. Between the steps it is possible to carry out steps which are not shown in the figure. In some embodiments step 201 and/or 204 can be omitted. In step 202 some other information identifying the PDP context can be extracted instead of the TID.

In addition to the means needed to implement the service according to the state of the art, the telecommunications system, telecommunications network and network node implementing the functionality according to the present invention comprise means for comparing the address included in the packet with the address/addresses activated, i.e. allowed, for the sender of the packet. Existing network nodes comprise processors and memory which can be utilized in the functions according to the invention. All changes needed to implement the invention can be carried out as additional or updated software routines and/or by means of application circuits (ASIC).

Even though it has been explained above that the edge element of the network (SGSN or GGSN) authenticates the subscriber, the invention is not limited to the edge elements. Another network node in which the address information needed for comparison is stored can also perform the comparison.

It should be understood that the above terms 'packet data protocol PDP' or 'PDP context' generally refer to a state in the terminal (e.g. in a mobile station) and to at least one network element or functionality. The state brings about a transmission path, i.e. a tunnel, having a specific number of parameters for data packets via the network used by the terminal (e.g. a mobile communication network). The term 'node' used in this specification should be interpreted as a term generally referring to a network element or functionality which processes data packets transmitted via the PDP tunnel.

It should be understood that the above description and the figures related thereto are only intended to illustrate the present invention. It will be obvious to the person skilled in the art that the invention can be modified in various ways without deviating from the scope and spirit of the invention disclosed in the enclosed claims.

The invention claimed is:

1. A network node comprising:

a processor configured:

to activate at least one packet data address for a terminal which packet data address the terminal can use when transmitting data packets, to attach a packet received from the terminal to the packet data address used by the terminal, to compare, in response to the network node receiving a packet, a source address of the packet with the packet data address used by the terminal and to instruct to send the packet from the network node towards a destination address of the packet only if the addresses are identical;

and a memory, accessible by the processor, the memory being configured to comprise information on the packet data address the terminal can use.

2. The network node of claim 1, the memory being further configured to store information on first packet data address types on which said comparison is performed, the processor being further configured to perform the comparison only if the packet data address used by the terminal is of the first packet data address type.

3. The network node of claim 1, wherein the network node is a gateway support node of a packet radio network using a general packet radio service tunneling protocol.

4. The network node of claim 1, wherein the network node is a support node serving the terminal in a packet radio network using a general packet radio service tunneling protocol.

5. A network node comprising:

a processor configured:

to activate at least one packet data address for a terminal which data packet address the terminal can use when transmitting data packets, the packet data address being defined as a set of allowed packet data addresses, to attach a packet received from the terminal to the packet data address used by the terminal, to check, in response to the network node receiving a packet sent from the terminal, whether a source address of the packet belongs to the set of allowed packet data addresses of the packet data address used by the terminal, and to instruct to send the packet from the network node towards a destination address of the packet only if the source address belongs to the set of allowed packet data addresses;

and a memory accessible by the processor, the memory being configured to comprise information on the set of allowed packet data addresses for the terminal.

6. The network node of claim 5, wherein the memory is further configured to store information on first packet data address types on which said comparison is performed, and the processor is further configured to perform the comparison only if the packet data address used by the terminal is of the first packet data address type.

7. The network node of claim 5, wherein the network node is a gateway support node of a packet radio network using a general packet radio service tunneling protocol.

8. The network node of claim 5, wherein the network node is a support node serving the terminal in a packet radio network using a general packet radio service tunneling protocol.

9. A computer readable storage medium encoded with computer-readable instructions thereon, which when loaded to a network node and executed by a computer, causes the network node to activate at least one packet data address for a terminal which packet data address the terminal can use when transmitting data packets, to attach a packet received from the terminal to the packet data address used by the terminal, to compare, in response to the network node receiving a packet, a source address included in the received packet with the packet address used by the terminal, and to instruct to send the packet from the network node towards a destination address of the packet only if the addresses are identical.

10. An apparatus suitable for use in a telecommunications system, the apparatus comprising:

a processor configured to:

activate a packet data address for a terminal, the packet data address being activated for transmitting data packets between the terminal and a second subsystem;

store the packet data address in a memory;

detect that a packet sent from the terminal has been received, the packet comprising a destination address and a source address;

check whether the source address of the packet is the same as the packet data address; and direct a transmission of the packet towards the destination address only if the addresses are identical.

11. An apparatus suitable for use in a telecommunications system, the apparatus comprising:

a processor configured to:

activate a packet data address for a terminal, the packet data address being defined as a set of allowed packet data addresses and activated for transmitting data packets between the terminal and a second subsystem;

store the packet data address in a memory;

detect that a packet sent from the terminal has been received, the packet comprising a destination address and a source address;

check whether the source address of the packet belongs to the set of allowed packet data addresses; and direct a transmission of the packet towards the destination address only if the source address of the packet belongs to the set of allowed packet data addresses.

12. A network node comprising:

a processor configured:

to activate at least one packet data address for a terminal which packet data address the terminal can use when transmitting data packets, to attach a packet received from the terminal to the packet data address used by the terminal, to compare, in response to the network node receiving a packet, a source address of the packet with the packet data address used by the terminal and to instruct that the packet be rejected if the source address and the packet data address are different, wherein the packet is not sent from the network node towards a destination address of the packet;

and a memory, accessible by the processor, the memory being configured to comprise information on the packet data address the terminal can use.

13. A network node comprising:

a processor configured:

to activate at least one packet data address for a terminal which data packet address the terminal can use when transmitting data packets, the packet data address being defined as a set of allowed packet data addresses, to attach a packet received from the terminal to the packet data address used by the terminal, to check, in response to the network node receiving a packet sent from the terminal, whether a source address of the packet belongs to the set of allowed packet data addresses of the packet data address used by the terminal, and to instruct the packet to be rejected if the source address does not belong to the set of allowed packet data addresses, wherein the packet is not sent from the network node towards a destination address of the packet;

and a memory accessible by the processor, the memory being configured to comprise information on the set of allowed packet data addresses for the terminal.

14. An apparatus suitable for use in a telecommunications system, the apparatus comprising:

a processor configured to:

activate a packet data address for a terminal, the packet data address being activated for transmitting data packets between the terminal and a second subsystem;

store the packet data address in a memory;

detect that a packet sent from the terminal has been received, the packet comprising a destination address and a source address;

check whether the source address of the packet is the same as the packet data address; and direct a rejection of the packet if the source address and the packet data address are different, wherein the packet is not sent towards the destination address of the packet.

15. An apparatus suitable for use in a telecommunications system, the apparatus comprising:

a processor configured to:

activate a packet data address for a terminal, the packet data address being defined as a set of allowed packet data addresses and activated for transmitting data packets between the terminal and a second subsystem;

store the packet data address in a memory;

detect that a packet sent from the terminal has been received, the packet comprising a destination address and a source address;

check whether the source address of the packet belongs to the set of allowed packet data addresses; and direct a rejection of the packet if the source address of the packet does not belong to the set of allowed packet data addresses, wherein the packet is not sent towards the destination address of the packet.

* * * * *